United States Patent [19]

Cowley

[11] 3,854,901
[45] Dec. 17, 1974

[54] SEPARATION OF GASEOUS MIXTURES OF CHLORINE DIOXIDE AND CHLORINE AND RECOVERY OF AQUEOUS SOLUTION OF CHLORINE DIOXIDE

[75] Inventor: Gerald Cowley, Mississauga, Ontario, Canada

[73] Assignee: ERCO Industries Limited, Islington, Ontario, Canada

[22] Filed: Nov. 20, 1973

[21] Appl. No.: 417,614

[52] U.S. Cl. .................................. 55/51, 55/71
[51] Int. Cl. ............................................ B01d 53/14
[58] Field of Search .............. 55/48, 51, 68, 71, 93, 55/94, 223; 423/477, 503

[56] References Cited
FOREIGN PATENTS OR APPLICATIONS
38-10    1/1963    Japan

*Primary Examiner*—Charles N. Hart
*Attorney, Agent, or Firm*—Sim & McBurney

[57] ABSTRACT

Gaseous mixtures of chlorine dioxide chlorine and steam are treated to provide an aqueous solution of chlorine dioxide having a low concentration of dissolved chlorine. This is achieved by countercurrently contacting the gaseous mixture with an aqueous solution of chlorine dioxide and chlorine to dissolve chlorine dioxide from the gas phase and to discharge chlorine from the gaseous phase. The steam is condensed and heats the aqueous solution. The resulting aqueous solution of chlorine dioxide and chlorine is subjected to countercurrent stripping with air or other inert gas at a temperature higher than the first countercurrent contact to remove chlorine dioxide and chlorine therefrom, the resulting chlorine dioxide solution being recovered. The gaseous mixture of air, chlorine dioxide and chlorine is subjected to countercurrent contact with water along with the gas mixture of chlorine dioxide and chlorine resulting from the first countercurrent contact.

7 Claims, 2 Drawing Figures

FIG. 1

SEPARATION OF GASEOUS MIXTURES OF CHLORINE DIOXIDE AND CHLORINE AND RECOVERY OF AQUEOUS SOLUTION OF CHLORINE DIOXIDE

FIELD OF INVENTION

The present invention relates to the separation of gaseous mixtures of chlorine dioxide and chlorine.

REFERENCE TO RELATED APPLICATION

The present invention represents an improvement on the invention described in copending application Ser. No. 417,613 filed concurrently herewith in the name of G. Cowley and G. I. Upatnieks and assigned to the assignee of the present application.

BACKGROUND TO THE INVENTION

Chlorine dioxide, which is used in bleaching operation, typically in the bleaching of cellulosic fibrous material pulps, may be formed in many different ways, generally involving the reduction of a chlorate by a chloride in an acid medium. The chlorine dioxide usually is used in the form of an aqueous solution thereof.

The basic reaction involved in such process is summarized by the equation:

$$ClO_3^- + Cl^- + 2H^+ \rightarrow ClO_2 + \tfrac{1}{2}Cl_2 + H_2O$$

Commonly, the formation of chlorine dioxide involves the reduction of an alkali metal chlorate with an alkali metal chloride in an acid medium containing sulphuric acid or other strong mineral acid. In this process, where the alkali metal is sodium, the reaction is represented by the equation:

$$NaClO_3 + NaCl + H_2SO_4 \rightarrow ClO_2 + \tfrac{1}{2}Cl_2 + H_2O + Na_2SO_4$$

An alternative process involves the reduction of the alkali metal chlorate in hydrochloric acid, the hydrochloric acid providing both the reductant and the acid medium. This process, where the alkali metal is sodium, is represented by the equation:

$$NaClO_3 + 2HCl \rightarrow ClO_2 + \tfrac{1}{2}Cl_2 + H_2O + NaCl$$

The gaseous chlorine dioxide produced in these processes therefore is obtained in admixture with chlorine. In view of the explosive nature of chlorine dioxide in high concentrations, the gaseous mixture of chlorine dioxide and chlorine usually is diluted with an inert gas, such as air or steam. In the present invention, separation of gas mixtures containing both these components is carried out.

The steam diluent is produced by maintaining the reaction mixture at its boiling point, generally with the reaction vessel maintained under a reduced pressure. Typical processes resulting in gas mixtures of this type are described in Canadian Pat. Nos. 825,084, 826,577 and 913,328.

Existing separation methods decrease the chlorine content of chlorine dioxide and chlorine gas mixtures provided by these processes, typically initially at a value of about 56 percent of the total of chlorine dioxide and chlorine in the gaseous mixture, to about 20 percent of the total of chlorine and chlorine dioxide in the aqueous solution resulting from contacting the gaseous mixture with water to dissolve the chlorine dioxide and part of the chlorine. However, a chlorine content of this level is undesirable in many uses of aqueous solutions of chlorine dioxide.

In copending application Ser. No. 417,613 referred to above, there are described procedures for decreasing the chlorine content of the aqueous solution of chlorine dioxide, while transferring substantially all the chlorine dioxide from the gaseous mixture to the aqueous solution. However, these procedures are incapable of decreasing the chlorine content below about 10 percent.

SUMMARY OF INVENTION

It now has been found, in accordance with the present invention, that an enhanced efficiency of separation of chlorine dioxide and chlorine may be achieved, resulting in an aqueous solution of chlorine dioxide which contains a lower proportion of chlorine than is achieved by conventional procedures and, in particular, a lower proportion of chlorine than is achieved by the procedures of the aforementioned application Ser. No. 417,613. The process of the present invention is capable of providing a chlorine dioxide solution in which the proportion of chlorine is below about 5 percent of the total of dissolved chlorine dioxide and chlorine, typically as low as about 4 percent.

In the present invention, chlorine dioxide is separated from gaseous mixtures thereof containing chlorine steam and an inert gas, such as air, and recovered as an aqueous solution thereof having a low dissolved proportion of chlroine by countercurrently contacting the gaseous mixture with a first aqueous solution of chlorine dioxide and chlorine thereby condensing the steam and heating the first aqueous solution of chlorine dioxide and chlorine. Part of the chlorine dioxide from the initial gas mixture is dissolved in the aqueous solution and the water formed from the condensation of steam thereby providing a second aqueous solution of chlorine dioxide and chlorine having an increased proportion of chlorine dioxide as compared to the first aqueous solution of chlorine dioxide and chlorine and a first gaseous mixture of chlorine dioxide, chlorine and inert gas having a decreased proportion of chlorine dioxide as compared with the initial gaseous mixture of chlorine dioxide, chlorine, steam and inert gas. The second aqueous solution of chlorine dioxide and chlorine is subjected to countercurrent stripping with an inert gas to remove chlorine dioxide and chlorine from the second aqueous solution of chlorine dioxide and chlorine, thereby forming a second gaseous mixture of chlorine dioxide, chlorine and inert gas and third aqueous solution of chlorine dioxide and chlorine having a reduced proportion of chlorine as compared to that of the second aqueous solution of chlorine dioxide and chlorine, the third aqueous solution being removed as a product steam. The second gaseous mixture of chlorine dioxide, chlorine and inert gas is mixed with the first gaseous mixture of chlorine dioxide, chlorine and inert gas and the mixture is subjected to countercurrent contact with water to dissolve substantially all the chlorine dioxide content and part of the chlorine content of the mixture, resulting in a discharge stream of chlorine and inert gas and a fourth aqueous solution of chlorine dioxide and chlorine which is used as the first aqueous solution of chlorine dioxide and chlorine.

DESCRIPTION OF PREFERRED EMBODIMENT

Figure 1:
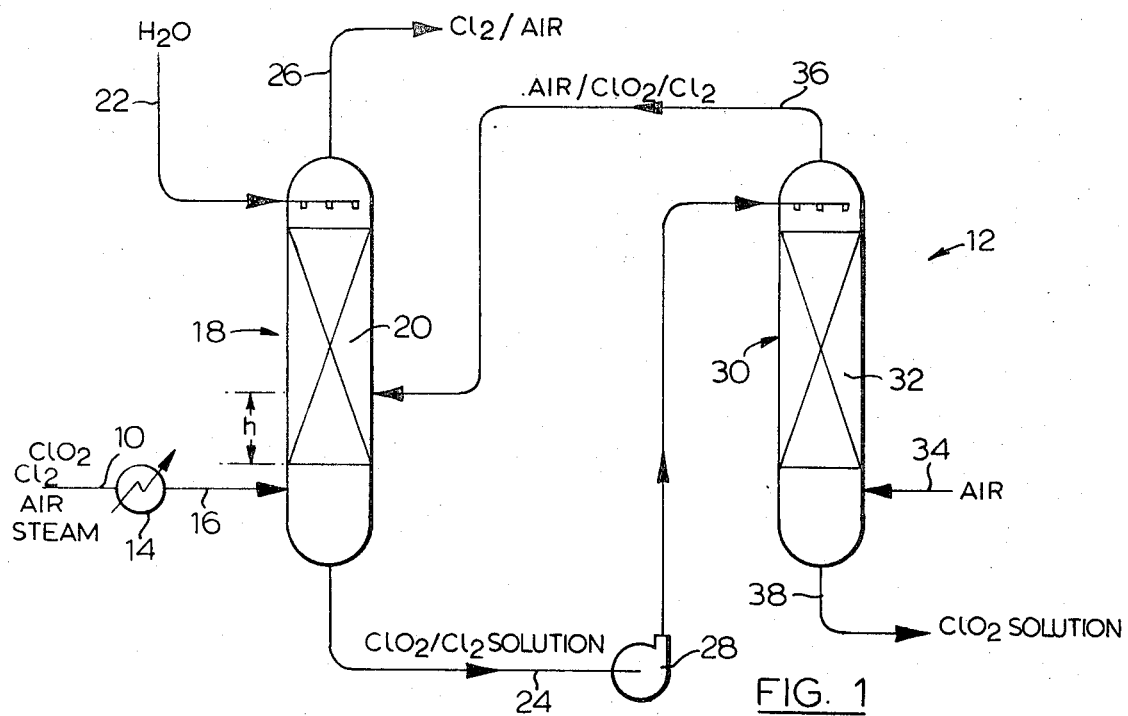
FIG. 1 is a schematic flow sheet illustrating one embodiment of the invention.

A mixture of chlorine dioxide, chlorine, steam and air, typically formed utilizing the procedures outlined in Canadian Pat. Nos. 825,084, 826,577 or 913,328, is fed by line 10 to a chlorine dioxide/chlorine separating apparatus 12 operating under a reduced pressure. The gaseous mixture first passes through a vapor condensor/cooler 14 and then by line 16 to a first gas-liquid contact tower 18 containing a first gas-liquid contact zone 20 of any convenient type maintained under a reduced pressure to achieve intimate countercurrent gas-liquid contact.

Part of the stream is condensed in the vapor condensor/cooler 14, the degree of cooling and hence steam condensation depending on the quantity of steam desired to be retained in the gas mixture to heat the aqueous phase in the first gas-liquid contacting zone 20.

The first-liquid contact zone 20 is maintained under a reduced pressure, typically in the range of 250 to 100 mm, which applies a reduced pressure on the chlorine dioxide generator.

The gas mixture rises through the first gas-liquid contact zone 20 and is countercurrently contacted by an aqueous solution of chlorine dioxide and chlorine provided by the dissolving of chlorine dioxide and chlorine gas in higher stages of the zone 20 in water fed by line 22 to the tower 18 at the top of the first gas-liquid contact zone 20 during passage thereof downwardly through the zone 20. The water may be fed to the tower 18 by line 22 in any convenient manner, typically through spray nozzles.

The aqueous solution of chlorine dioxide and chlorine contacting the gaseous mixture in the lower portion of the zone 20, dissolves chlorine dioxide from the gaseous mixture, while releasing chlorine therefrom. At the same time, condensation of water vapor from the gas mixture occurs, resulting in an increase in the temperature of the solution and a corresponding increase in the partial pressures of chlorine dioxide and chlorine. This temperature rise typically is about 5° to 10° F, and is determined by the quantity of steam in the gas mixture fed by line 16.

The dissolving of the chlorine dioxide and the release of chlorine from the aqueous solution phase occurs due to the following phenomena. Since the system is operated under a reduced pressure and chlorine dioxide is dissolved by the condensed water vapor more quickly than chlorine, the removal of chlorine dioxide from the vapor phase by absorption in the condensed water vapor and the existing aqueous phase increases the partial pressure of chlorine in the vapor phase. Therefore, as the first gas-liquid contact zone 20 is ascended, the mass rate of solution of chlorine increases due to increasing partial pressure while the mass rate of solution of chlorine dioxide decreases. At some level in the zone 20, therefore, chlorine vapor is in equilibrium with the liquid phase, and therefore, at points below this level, chlorine is stripped out of the aqueous phase while chlorine dioxide is dissolved in the aqueous pahse due to the lower partial pressure of chlorine than the theoretical equilibrium at the higher level. Typically the equilibrium point is high up the tower 18, in order to promote dissolving of chlorine dioxide in the aqueous phase and stripping of chlorine from the aqueous phase in the zone 20.

Figure 2:
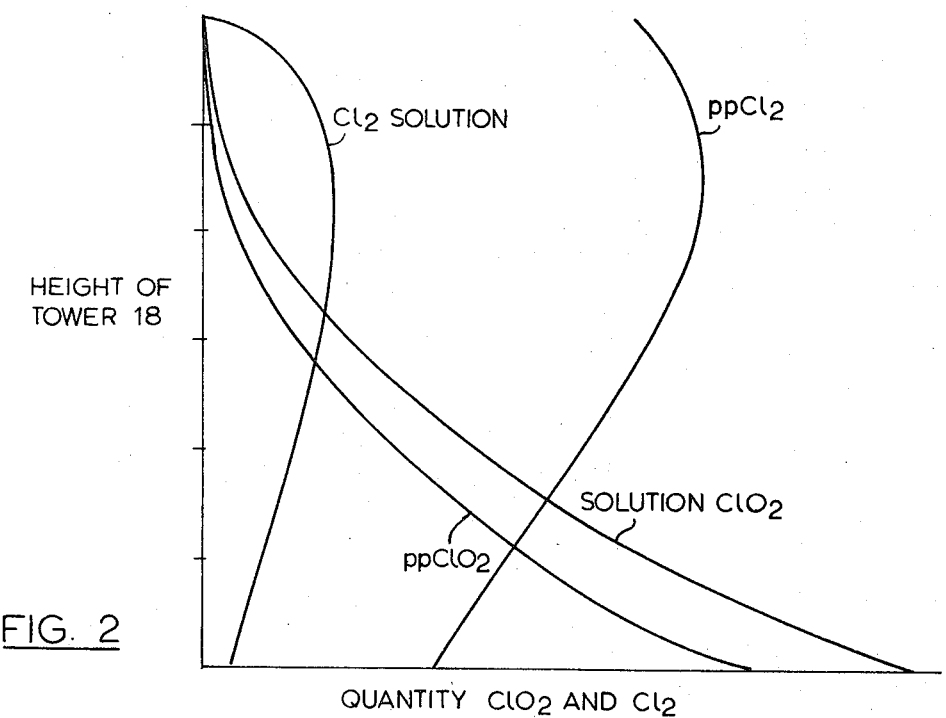
FIG. 2 is a graph illustrating the partial pressures and concentration of chlorine dioxide and chlorine in one tower used in the embodiment of FIG. 1.

FIG. 2 illustrates the variations of partial pressure and concentration of both chlorine dioxide and chlorine as the first gas-liquid contact zone 20 is ascended. It will be seen from this graph and as discussed in more detail above, the concentration of chlorine dioxide in the aqueous phase decreases with increasing height, paralleling a similar decrease in partial pressure of chlorine dioxide in the gas phase. In contrast, the concentration of chlorine in the aqueous phase increases with increasing height of zone 20 paralleling an increase in the partial pressure of chlorine in the gas phase up to a point where the gas phase and the aqueous phase are in equilibrium. Above this equilibrium point partial pressure and concentration of chlorine both fall.

The resulting aqeuous solution of chlorine dioxide leaving tower 18 by line 24 contains dissolved chlorine in a quantity corresponding to the solubility of chlorine in the aqueous solution under the prevailing conditions of concentration of chlorine dioxide and temperature of the solution and pressure on the system.

In the first gas-liquid contact zone 20 substantially all the chlorine dioxide content of the gaseous mixture fed by line 16 is dissolved therefrom, as is illustrated by FIG. 2, and is present in the chlorine dioxide solution in line 24. The remaining chlorine and air leaves the tower 18 by line 26 for recovery of chlorine in any convenient manner or for utilization in any convenient procedure. The reduced pressure applied to the tower 18 and hence zone 20 may be applied through the line 26.

The quantity of chlorine dioxide present in the aqueous solution in line 24, depends on the flow rates of water in line 20 and gaseous mixture in line 16.

The aqueous solution of chlorine dioxide and chlorine in line 24 is forwarded, by pumping using pump 28, if desired, to a second tower 30 containing a second gas-liquid contact zone 32 of any convenient construction for allowing intimate countercurrent gas-liquid contact. The aqueous solution in line 24 may be fed to the top of the second gas-liquid contact zone 32 in any convenient manner.

As the aqueous solution of chlorine dioxide and chlorine moves downwardly through the second gas-liquid contact zone 32 it is subjected to countercurrent contact with a rising stream of air fed to the tower 30 by line 34. Chlorine dioxide and chlorine both are stripped from the solution by the air and hence a gaseous mixture of chlorine dioxide, chlorine and air is removed from the top of the tower 30 by line 36.

Since the quantity of chlorine dioxide in the solution in line 24 is considerably greater than the quantity of chlorine, stripping both chlorine dioxide and chlorine in the second gas-liquid contact zone 32 has the effect of decreasing the absolute concentration of both chlorine dioxide and chlorine in the aqueous phase, thereby resulting in a aqueous chlorine dioxide solution leaving the base of the second tower 30 by line 38 containing only a low proportion of dissolved chlorine, the proportion of the chlorine contained in the aqueous chlorine dioxide solution in line 38 depends on the quantity of air, the temperature of operation of the zone 32, the concentration of chlorine dioxide desired in the solution in line 38, the initial concentrations of chlorine dioxide and chlorine in line 24 and the height of the second zone 32.

It is preferred to operate the second zone 32 at as low a temperature as possible, preferably below 50° F, but at the same time it is essential that the second zone 32 operate at a temperature which is greater than the temperature of the first zone 20.

The gaseous mixture of chlorine dioxide, chlorine and air in line 36 is recycled to the first tower 18 for feed to the first gas-liquid zone 20 at a height $h$ above the point of introduction of the tower of the gaseous mixture in line 16. The height $h$ of the zone 20 corresponds to the height at which the relative proportions of chlorine dioxide and chlorine are the same as the value of the relative proportions of are the same as the value of the relative proportions of chlorine dioxide and chlorine in the gas mixture in line 36, so that the introduction of the gas mixture in line 36 to the zone 20 does not substantially affect the gas phase liquid-phase equilibrium existing in the zone 20 at that point.

In this way, the chlorine dioxide contained in the gas mixture in line 36 is dissolved therefrom, in accordance with the graph of FIG. 2, by the falling aqueous solution and the chlorine contained in the gas mixture is recovered in line 26. The chlorine dioxide in the gas mixture in line 36 therefore is not lost from the system.

While the first gas-liquid contact zone 20 is illustraded as a single gas-liquid contact zone, it is provible to separate the zone 20 into two sections, with the split occurring at the height $h$. However, it is preferred to operate in the manner illustrated.

Air has been described for use in the stripping zone 32 and in admixture with the gas mixture in line 16. Any other convenient inert gas may be utilized, if desired, although air is preferred due to its ready availability.

The process of the present invention differs from the procedure outlined in the above-mentioned copending application Ser. No. 417,613, in that, in the procedure outlined in the copending application, the gas stream equivalent to that contained in line 36 is fed to the base of the gas-liquid contact zone equivalent to zone 20 in admixture with the gas mixture equivalent to that contained in line 16. In contrast, the gas stream in line 36 is introduced to zone 20 at a height $h$ above the base of the zone, so that the proportions of chlorine dioxide and chlorine in the mixture in line 36 are compatible with those outlined in the tower at that point.

A direct consequence of this difference is that, by the procedure of the present invention, a much decreased quantity of chlorine is present in the product chlorine dioxide solution as compared to that present in the chlorine dioxide solution provided by the procedure of the copending application.

EXAMPLE

A system was set up of the type illustrated in FIG. 1 with a total pressure of 180 mm in the tower 18. A mixture of chlorine dioxide and chlorine, steam and air containing 53.19 mm Hg of chlorine dioxide and 29.295 mm Hg of chlorine was fed by line 16 to the base of zone 20 which contained two theoretical stages in height $h$ and eight theoretical stages in the remainder of the height of the zone 20. Water was fed by line 22 at a temperature of about 40° F, and an aqueous solution of chlorine dioxide and chlorine was recovered in line 24 containing about 14 gpl of chlorine dioxide and about 1 gpl of chlorine.

This aqueous solution was stripped with air fed by line 34 at a rate of 0.438 moles/mole of chlorine dioxide with the zone 32 operating at a temperature of about 50° F, and the resulting gas mixture of air, chlorine dioxide and chlorine was fed by line 36 to a point two theoretical stages from the base of the zone 20.

The aqueous solution of chlorine dioxide recovered in line 38 contained about 8 gpl chlorine dioxide and about 5 percent of its weight as chlorine. A yield of about 99.7 percent of chlorine dioxide was obtained in the solution in line 38.

Modifications are possible within the scope of the invention.

What I claim as my invention is:

1. A method for the separation of gaseous mixtures of chlorine dioxide and chlorine which comprises:

feeding a gaseous mixture of chlorine dioxide, chlorine, stean and an inert gas to a first gas-liquid contacting zone, subjecting said gaseous mixture to countercurrent contact in said first contacting zone with a first aqueous solution of chlorine dioxide and chlorine, condensing said steam by said countercurrent contact and thereby heating said first aqueous solution of chlorine dioixde and chlorine, dissolving part of the chlorine dioxide from said gas mixture in said aqueous solution and the water formed by condensation of said steam, thereby providing second aqueous solution of chlorine dioxide and chlorine having an increased proportion of chlorine dioxide as compared to said first aqueous solution of chlorine dioxide and chlorine, and a first gaseous mixture of chlorine dioxide, chlorine and inert gas having a decreased proportion of chlorine dioxide as compared with said gaseous mixture of chlorine dioxide, chlorine, steam and inert gas, removing said second aqueous solution of chlorine dioxide and chlorine from said first contacting zone, passing said second aqueous solution of chlorine dioxide and chlorine to a second gas-liquid contacting zone, subjecting said second aqueous solution of chlorine dioxide and chlorine to countercurrent contact with an inert gas in said second contacting zone to remove chlorine and chlorine dioxide therefrom at a temperature greater than the temperature of said first contacting zone thereby forming a second gaseous mixture of chlorine dioxide, chlorine and inert gas and a third aqueous solution of chlorine dioxide and chlorine having a reduced proportion of chlorine as compared to that of the second aqueous solution of chlorine dioxide and chlorine, the quantity of chlorine dioxide removed exceeding the quantity of chlorine removed from said second aqueous solution of chlorine dioxide and chlorine, removing the second gaseous mixture of chlorine dioxide chlorine and inert gas from said second gas-liquid contacting zone, mixing said second gaseous mixture of chlorine dioxide, chlorine and inert gas with said first gaseous mixture of chlorine dioxide, chlorine and inert gas, the proportion of chlorine dioxide present in said first gaseous mixture and in said second gaseous mixture being substantially the same, subjecting the resulting third gaseous mixture of chlorine dioxide, chlorine and inert gas to countercurrent contact with water in a third gas-liquid contacting zone to dissolve substantially all the chlorine dioxide and part of the chlorine from said third gaseous mixture thereby forming a fourth aqueous solution of chlorine dioxide and chlorine, and a gaseous mixture containing chlorine and an inert gas and being substantially free from chlorine dioxide, passing said fourth aqueous solution of chlorine dioxide and chlorine from said third contacting zone to said first contacting zone as said first aqueous solution of chlorine dioxide and chlorine, recovering said gaseous mixture of chlorine and inert gas from said third contacting zone, and recovering said third aqueous solution of chlorine dioxide and chlorine from said second contacting zone.

2. The process of claim 1 wherein said first and third gas-liquid contacting zones are constituted by a single vertically-extending gas-liquid contact zone into which said gaseous mixture of chlorine dioxide, chlorine, steam and inert gas is fed at the bottom thereof and is allowed to rise in said single gas-liquid contact zone, said water is fed at the top thereof and is allowed to fall in said single gas-liquid contact zone, and said second gaseous mixture of chlorine dioxide, chlorine and inert gas is fed into the single gas-liquid contact zone at a level between the top and bottom thereof.

3. The pocess of claim 2 wherein said second gaseous mixture of chlorine dioxide, chlorine and inert gas is fed into the single gas-liquid contact zone at a level at which the proportion of chlorine dioxide and chlorine in said second gaseous mixture is substantially the same as those in said single gas-liquid contact zone at that level.

4. The process of claim 2 wherein the temperature of operation of said second gas-liquid contact zone is about 5° to 10° F greater than the temperature of said water.

5. The process of claim 4 wherein the temperature of operation of said second gas-liquid contact zone is below about 50° F.

6. The process of claim 1 wherein said countercurrent contact in said second gas-liquid contact zone is carried out to result in said third aqueous solution of chlorine dioxide and chlorine wherein the proportion of chlorine is less than about 5 percent.

7. The process of claim 1 wherein said inert gas is air.

* * * * *